No. 684,867. Patented Oct. 22, 1901.
W. G. H. RIPPER.
ANIMAL TRAP.
(Application filed Feb. 14, 1901.)

(No Model.)

Witnesses
J. H. Hamilton
Wm. W. Wilson

Inventor
William G. H. Ripper
by J. H. Stevenson
Attorney

THE NORRIS PETERS CO., PHOTO-LITHO., WASHINGTON, D. C.

UNITED STATES PATENT OFFICE.

WILLIAM G. H. RIPPER, OF NEW BRIGHTON, PENNSYLVANIA.

ANIMAL-TRAP.

SPECIFICATION forming part of Letters Patent No. 684,867, dated October 22, 1901.

Application filed February 14, 1901. Serial No. 47,359. (No model.)

*To all whom it may concern:*

Be it known that I, WILLIAM G. H. RIPPER, a citizen of the United States of America, residing at New Brighton, in the county of Beaver and State of Pennsylvania, have invented certain new and useful Improvements in Animal-Traps; and I do hereby declare the following to be a full, clear, and exact description thereof, reference being had to the accompanying drawings, which form a part of this specification.

My invention relates to certain new and useful improvements in animal-traps, and as a novel feature in such I provide a means of ejecting the imprisoned animal, so that it may be killed by dogs or other means.

Figure 1:
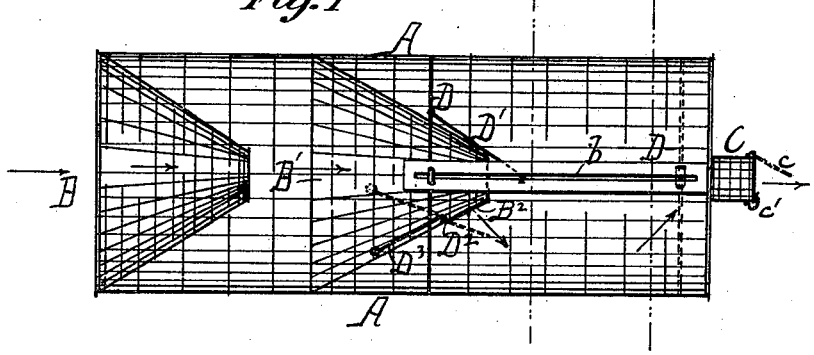
Figure 2:
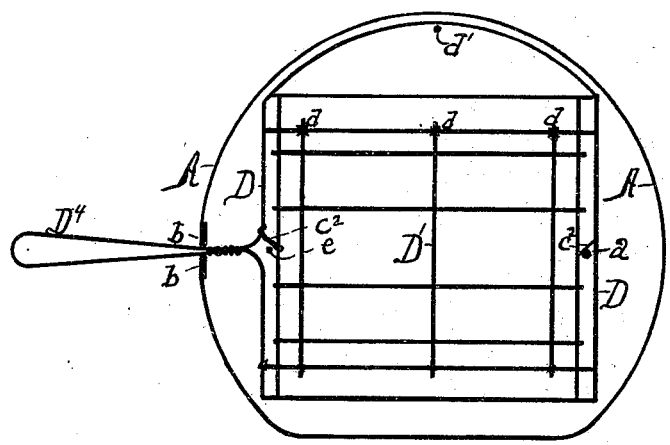

In the accompanying drawings, forming part of this specification, Figure 1 is a side view of my improved animal-trap; and Fig. 2 is an end sectional view of the same, showing my improved ejector in position.

A is the body of the trap, which may be made of any suitable material, but preferably of wire, and in size may be made for large or small animals.

B is the entrance to the trap, which I show in conical form. The animal passes through this part and into the space below its mouth, and as the difficulty of returning through this conical opening is much greater than passing through the second conical way $B'$ the animal goes on through this second way, passing over a trap-door $B^2$, which is pivoted at $D^2$ and has a weighted lever $D^3$ to close the same when the animal passes off, thus being always in position for the next animal.

$D'$ is a hinged door in the movable partition D. This movable partition may be made of any suitable material and may be of wire, as I have shown it. This door $D'$ is hinged at $d\ d\ d$. The partition is moved by a handle $D^4$ through the slot $b$ along the side of the trap and is kept up and in position by guide-wires $a$, $e$, and $d'$, stretched lengthwise in the trap. The dotted line near the end next to the exit shows this movable partition in a changed position after the animal has been ejected.

C is the exit from the trap, $c$ a door, and $c'$ a latch to fasten the door.

$c^2\ c^2$ are bearings to aid in sliding the movable partition toward the exit and back.

The animal on passing through the conical opening over the trap $B^2$ drops down into the main chamber of the trap, when the weighted lever $D^3$ closes the return-way. Then when it is desired to force the animal out through the exit C the movable partition is passed along over the guide-wires and through the slotted portion. In this way an exit is forced. The difficulty in getting the captured animal out of other traps is in this way overcome.

Having thus fully shown and described my invention, what I claim as new, and desire to secure by Letters Patent, is—

1. The combination in an animal-trap of a movable partition supported therein, the handle $D^4$ operated in the slot $b$, formed in the side of the trap, substantially as described and shown.

2. In an animal-trap: a sliding partition having a hinged door $D'$; supports $a$, $e$ and $d'$ in combination with a slot $b$ made in the side of the trap; substantially as described and shown.

In testimony whereof I have hereunto affixed my signature in the presence of two subscribing witnesses.

WM. G. H. RIPPER.

Witnesses:
    WM. W. WILSON,
    J. H. HAMILTON.